United States Patent
Abe et al.

(10) Patent No.: US 9,793,576 B2
(45) Date of Patent: Oct. 17, 2017

(54) NONAQUEOUS ELECTROLYTIC SOLUTION AND ENERGY STORAGE DEVICE USING SAME

(71) Applicant: UBE INDUSTRIES, LTD., Ube-shi (JP)

(72) Inventors: Koji Abe, Ube (JP); Masahide Kondo, Ube (JP)

(73) Assignee: UBE INDUSTRIES, LTD., Ube-shi (JP)

( * ) Notice: Subject to any disclaimer, the term of this patent is extended or adjusted under 35 U.S.C. 154(b) by 448 days.

(21) Appl. No.: 14/387,335

(22) PCT Filed: Mar. 22, 2013

(86) PCT No.: PCT/JP2013/058239
§ 371 (c)(1),
(2) Date: Sep. 23, 2014

(87) PCT Pub. No.: WO2013/141345
PCT Pub. Date: Sep. 26, 2013

(65) Prior Publication Data
US 2015/0050562 A1    Feb. 19, 2015

(30) Foreign Application Priority Data

Mar. 23, 2012    (JP) ................................ 2012-068003

(51) Int. Cl.
| | |
|---|---|
| *H01M 10/0567* | (2010.01) |
| *H01M 4/58* | (2010.01) |
| *H01M 4/525* | (2010.01) |
| *H01M 4/52* | (2010.01) |
| *H01M 10/052* | (2010.01) |
| *H01M 10/0568* | (2010.01) |
| *H01M 10/0569* | (2010.01) |
| *H01M 10/0566* | (2010.01) |
| *H01M 4/133* | (2010.01) |

(52) U.S. Cl.
CPC ......... *H01M 10/0567* (2013.01); *H01M 4/52* (2013.01); *H01M 4/525* (2013.01); *H01M 4/5825* (2013.01); *H01M 10/052* (2013.01); *H01M 10/0566* (2013.01); *H01M 10/0568* (2013.01); *H01M 10/0569* (2013.01); *H01M 4/133* (2013.01); *H01M 2300/0028* (2013.01); *H01M 2300/0034* (2013.01); *H01M 2300/0037* (2013.01); *Y02T 10/7011* (2013.01)

(58) Field of Classification Search
CPC ......... H01M 10/0567; H01M 10/0568; H01M 10/0569; H01M 10/052; H01M 10/0566; H01M 2300/0034; H01M 2300/0037; H01M 4/133; H01M 4/525; H01M 4/52; H01M 4/5825; Y02T 10/7011
See application file for complete search history.

(56) References Cited

U.S. PATENT DOCUMENTS

| | | |
|---|---|---|
| 2002/0122988 A1 | 9/2002 | Hamamoto et al. |
| 2009/0053598 A1 | 2/2009 | Abe et al. |
| 2010/0015514 A1 | 1/2010 | Miyagi et al. |
| 2010/0239919 A1 | 9/2010 | Abe et al. |
| 2011/0183199 A1 | 7/2011 | Abe |
| 2013/0022861 A1 | 1/2013 | Miyagi et al. |
| 2013/0022880 A1 | 1/2013 | Tsujioka et al. |
| 2013/0052541 A1 | 2/2013 | Abe et al. |
| 2013/0216919 A1 | 8/2013 | Tokuda et al. |
| 2014/0234727 A1 | 8/2014 | Abe et al. |
| 2015/0243936 A1 | 8/2015 | Miyagi et al. |

FOREIGN PATENT DOCUMENTS

| | | |
|---|---|---|
| CN | 1350343 A | 5/2002 |
| CN | 101107745 A | 1/2008 |
| EP | 1 939 971 A1 | 7/2008 |
| EP | 2 770 572 A1 | 8/2014 |

(Continued)

OTHER PUBLICATIONS

Combined Chinese Office Action and Search Report issued Jan. 13, 2016 in Patent Application No. 201380015972.1 (with English Translation of Categories of Cited Documents).
International Search Report issued Jun. 4, 2013 in PCT/JP2013/058239 (with English Translation).
Extended European Search Report dated Dec. 4, 2015 in Patent Application 13764421.7.
David Linden, et al., "Handbook of Batteries Third Eddition" Characteristics of Organic Solvents, XP055196924, Jan. 2, 2003, p. 35.23.

*Primary Examiner* — Laura Weiner
(74) *Attorney, Agent, or Firm* — Oblon, McClelland, Maier & Neustadt, L.L.P.

(57) ABSTRACT

The present invention is to provide a nonaqueous electrolytic solution prepared by dissolving an electrolyte salt in a nonaqueous solvent and an energy storage device, wherein the nonaqueous electrolytic solution includes LiPF$_2$(—OC(=O)—C(=O)O—)$_2$ and at least one kind of a compound having a carbon-carbon triple bond represented by the following general formula (I):

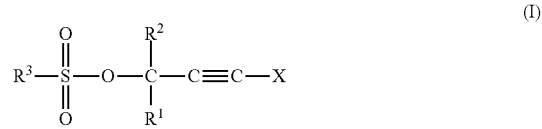

(wherein R$^1$ and R$^2$ each independently represent a hydrogen atom or an alkyl group having from 1 to 6 carbon atoms and optionally substituted with a halogen atom; and R$^3$ represents a methyl group or an ethyl group. X represents a hydrogen atom or —CR$^1$R$^2$—OS(=O)$_2$—R$^3$.).

19 Claims, No Drawings

(56) References Cited

FOREIGN PATENT DOCUMENTS

| | | |
|---|---|---|
| JP | 2000-195545 A | 7/2000 |
| JP | 2002-100399 A | 4/2002 |
| JP | 2002-112034 A | 4/2002 |
| JP | 2005-285491 A | 10/2005 |
| JP | 2011-222193 A | 11/2011 |
| JP | 2011-233338 A | 11/2011 |
| WO | WO 2012/035821 A1 | 3/2012 |

NONAQUEOUS ELECTROLYTIC SOLUTION AND ENERGY STORAGE DEVICE USING SAME

TECHNICAL FIELD

The present invention relates to a nonaqueous electrolytic solution that can improve the electrochemical properties in a broad temperature range and an energy storage device using the same.

BACKGROUND ART

In recent years, an energy storage device, particularly a lithium secondary battery is widely used for a small-sized electronic equipment such as a cellular phone and a laptop computer, an electric vehicle or storage of the electric power. These electronic equipments, vehicle or storage of the electric power is likely to be used in a broad temperature range of high temperature in the midsummer, low temperature in the arctic weather etc., and thus it is required to improve the electrochemical properties in a broad temperature range with a good balance.

Particularly in order to prevent global warming, it is urgently needed to cut $CO_2$ discharge, and immediate diffusion of a hybrid electric vehicle (HEV), a plug-in hybrid electric vehicle (PHEV), or a battery electric vehicle (BEV) is demanded, among environment-friendly cars loaded with an energy storage device including an energy storage device such as a lithium secondary battery and a capacitor. A vehicle has long migration length, and thus is likely used in a region of broad temperature range from tropical, very hot region to arctic weather region. Accordingly, these energy storage devices for a vehicle are demanded to have no deterioration for the electrochemical properties even when used in a broad temperature range from high temperature to low temperature.

Note that, in the present description, the term of the lithium secondary battery is used as a concept including the so-called lithium ion secondary battery.

A lithium secondary battery mainly consists of a positive electrode and a negative electrode containing materials which can absorb and release lithium, and a nonaqueous electrolytic solution including a lithium salt and a nonaqueous solvent, and as the nonaqueous solvent, a carbonate such as ethylene carbonate (EC) and propylene carbonate (PC) is used.

Further, as the negative electrode, metal lithium, and a metal compound (metal element, oxide, alloy with lithium, etc.) and a carbon material which can absorb and release lithium are known. Particularly, lithium secondary battery produced by using a carbon material, such as coke, artificial graphite, natural graphite and the like which can absorb and release lithium are widely put into practical use.

In a lithium secondary battery produced by using, for example, highly crystallized carbon materials, such as artificial graphites, natural graphites and the like as a negative electrode material, it is known that decomposed products and gases generated from a solvent in a nonaqueous electrolytic solution which is reduced and decomposed on a surface of a negative electrode in charging the battery detract from a desired electrochemical reaction of the battery, so that a cycle property thereof is worsened. Also, when the decomposed products of the nonaqueous solvent are deposited, lithium can not smoothly be absorbed onto and released from a negative electrode, and the electrochemical characteristics thereof are liable to be worsened in a broad temperature range.

Further, in a lithium secondary battery produced by using lithium metal and alloys thereof, metal element, such as tin, silicon and the like and oxides thereof as a negative electrode material, it is known that an initial battery capacity thereof is high but a nonaqueous solvent is acceleratingly reduced and decomposed as compared with a negative electrode of a carbon material since a micronized powdering of the material is promoted during cycles and that battery performances, such as a battery capacity and a cycle property are worsened to a large extent. Also, in a case the micronized powdering of the negative electrode material and the deposition of the decomposed products of the nonaqueous solvent are deposited, lithium can not smoothly be absorbed onto and released from the negative electrode, and the electrochemical characteristics thereof are liable to be worsened in a broad temperature range.

On the other hand, in a lithium secondary battery produced by using, for example, $LiCoO_2$, $LiMn_2O_4$, $LiNiO_2$, $LiFePO_4$ and the like as a positive electrode, it is known that decomposed products and gases generated from a solvent in a nonaqueous electrolytic solution which is partially oxidized and decomposed in a local part on an interface between the positive electrode material and the nonaqueous electrolytic solution in a charging state detract from a desired electrochemical reaction of the battery, so that the electrochemical characteristics thereof are worsened as well in a broad temperature range.

As described above, the decomposed product and the gas generated through decomposition of the nonaqueous electrolytic solution on the positive electrode or the negative electrode may inhibit migration of lithium ions or may swell the battery, which may worsen the battery performance. Irrespective of the situation, the multifunctionality of electronic appliances equipped with lithium secondary batteries therein is more and more enhanced and power consumption tends to increase. The capacity of lithium secondary battery is thus being much increased, and the space volume for the nonaqueous electrolytic solution in the battery is decreased by increasing the density of the electrode and by reducing the useless space volume in the battery. Accordingly, the current situation is that the electrochemical characteristics in a broad temperature range of the battery may be worsened even with decomposition of only a small amount of the nonaqueous electrolytic solution.

Patent Reference 1 discloses a nonaqueous electrolytic solution that contains cyclic carbonates, chain carbonates and carbonates having an unsaturated bond in a nonaqueous solvent and that is added an ionic metal complex, saying that the battery is excellent in cycle properties and storage properties at high temperatures.

Patent Document 1: Japanese Patent Publication No. 2005-285491

SUMMARY OF THE INVENTION

Problem to be Solved by the Invention

The object of the present invention is to provide a nonaqueous electrolytic solution that can improve the electrochemical properties in a broad temperature range and an energy storage device using the same.

Means for Solving the Problems

The present inventors investigated in detail, the performances of the nonaqueous electrolytic solution of the prior arts described above. As a result, it cannot be said in the actual circumstances that the nonaqueous electrolytic solutions of the above Patent Document 1 can sufficiently solve the objects of improving electrochemical properties in a broad temperature range such as the discharge properties at low temperature after charge and storage at high temperature.

Upon this, the present inventors have repeated the researches earnestly to solve the problems, and found that the electrochemical properties, particularly the electrochemical properties of a lithium cell in a broad temperature range, can be improved by means of a nonaqueous electrolytic solution in which contains $LiPF_2(-OC(=O)-C(=O)O-)_2$ and the compound represented by the general formula (I) having a carbon-carbon triple bond in the nonaqueous electrolytic solution, whereby to complete the present invention.

The present invention provides the following items (1) and (2).

(1) A nonaqueous electrolytic solution prepared by dissolving an electrolyte salt in a nonaqueous solvent, wherein the nonaqueous electrolytic solution includes $LiPF_2(-OC(=O)-C(=O)O-)_2$ and at least one kind of a compound having a carbon-carbon triple bond represented by the following general formula (I):

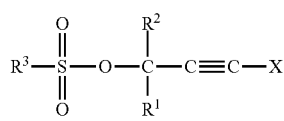

(wherein $R^1$ and $R^2$ each independently represent a hydrogen atom or an alkyl group having from 1 to 6 carbon atoms and optionally substituted with a halogen atom; and $R^3$ represent a methyl group or an ethyl group. X represents a hydrogen atom or $-CR^1R^2-OS(=O)_2-R^3$.)

(2) An energy storage device comprising a positive electrode, a negative electrode and a nonaqueous electrolytic solution prepared by dissolving an electrolyte salt in a nonaqueous solvent, wherein the nonaqueous electrolytic solution includes $LiPF_2(-OC(=O)-C(=O)O-)_2$ and at least one kind of a compound having a carbon-carbon triple bond represented by the above-mentioned general formula (I).

Effects of the Invention

According to the present invention, it is possible to provide a nonaqueous electrolytic solution that can improve the electrochemical properties in a broad temperature range, particularly the discharge property at low temperature after charge and storage at high temperature, and an energy storage device such as a lithium cell using the same.

DESCRIPTION OF EMBODIMENTS

[Nonaqueous Electrolytic Solution]

The nonaqueous electrolytic solution of the present invention is a nonaqueous electrolytic solution in which an electrolytic salt is dissolved in a nonaqueous solvent, and which contains $LiPF_2(-OC(=O)-C(=O)O-)_2$ and the compound represented by the general formula (I) having a carbon-carbon triple bond in the nonaqueous electrolytic solution.

The reasons that the nonaqueous electrolytic solution of the present invention can drastically improve the electrochemical properties in a broad temperature range are not necessarily clear, but the followings are considered.

Li salt represented as $LiPF_2(-OC(=O)-C(=O)O-)_2$ which is used in combination in the present is decomposed on the negative electrode, and forms a coating film having a low resistance. However it has fluorine atom which is easily released from the coating film, when storaged at high temperature, due to released fluorine atom, corrosion of metal members such as current correctors is liable to be promoted. As a result, the discharge property at low temperature declines greatly. On the other hand, we found that combinational use of phosphoric Li salt represented as $LiPF_2(-OC(=O)-C(=O)O-)_2$, which having two oxalate structure, and the compound represented by the general formula (I) having both a sulfonyloxy group and a carbon-carbon triple bond, suppresses corrosion described above and forms strong surface film by decomposition of these compounds on negative electrode surface. And, we found that this triggers the improvement of electrochemical properties in wide temperature range.

In the nonaqueous electrolytic solution of the present invention, the content of $LiPF_2(-OC(=O)-C(=O)O-)_2$ contained in the nonaqueous electrolytic solution is preferably 0.001 to 10 mass % in the nonaqueous electrolytic solution. If the content is 10 mass % or less, the fear of the decline of the properties at low temperature due to too much formation of the coating film on the electrode is small. In addition, if the content is 0.001 mass % or more, formation of the coating film is sufficient, and effects of improving the storage properties at high temperature increase. The content is preferably 0.01 mass % or more, more preferably 0.05 mass % or more and particularly preferably 0.5 mass % or more in the nonaqueous electrolytic solution. In addition, the upper limit thereof is preferably 8 mass % or less, more preferably 6 mass % or less, and particularly preferably 4 mass % or less.

The compound having the carbon-carbon triple bond contained in the nonaqueous electrolytic solution of the present invention is represented by the general formula (I) described below.

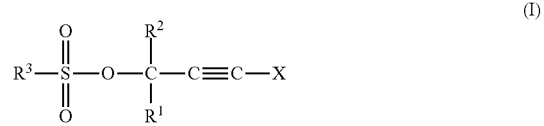

(wherein $R^1$ and $R^2$ each independently represent a hydrogen atom or an alkyl group having from 1 to 6 carbon atoms and optionally substituted with a halogen atom; and $R^3$ represent a methyl group or an ethyl group. X represents a hydrogen atom or $-CR^1R^2-OS(=O)_2-R^3$.)

In the above-mentioned general formula (I), $R^1$ and $R^2$ each independently represent a hydrogen atom or an alkyl group having from 1 to 6 carbon atoms and optionally substituted with a halogen atom; and $R^3$ represents a methyl group or an ethyl group, and further preferably a methyl group.

As specific examples of said $R^1$ and $R^2$, preferably mentioned are a hydrogen atom, linear alkyl groups such as a methyl group, an ethyl group, an n-propyl group, an n-butyl group, an n-pentyl group, and an n-hexyl group, etc.; branched alkyl groups such as an iso-propyl group, a secbutyl group, a tert-butyl group, and a tert-amyl group, etc.; and alkyl groups in which the hydrogen atom is partly substituted with a fluorine atom such as a fluoromethyl group, a trifluoromethyl group, and a 2,2,2-trifluoroethyl group etc.

Among them, $R^1$ and $R^2$ are preferably a hydrogen atom, a methyl group, an ethyl group, an n-propyl group an iso-propyl group, or a trifluoromethyl group, and more preferably a hydrogen atom, a methyl group, or an ethyl group. And it is further preferable that both of $R^1$ and $R^2$ are a hydrogen atom.

As the compound represented by said general formula (I), the following compound may be suitably mentioned specifically.

Suitably mentioned are 2-propynyl methane sulfonate, 1-methyl-2-propynyl methane sulfonate, 1-ethyl-2-propynyl methane sulfonate, 1,1-dimethyl-2-propynyl methane sulfonate, 1,1-diethyl-2-propynyl methane sulfonate, 1-ethyl-1-methyl-2-propynyl methane sulfonate, 2-butyne-1,4-diyl dimethane sulfonate, 2-propynyl ethane sulfonate, 1-methyl-2-propynyl ethane sulfonate, 1-ethyl-2-propynyl ethane sulfonate, 1,1-dimethyl-2-propynyl ethane sulfonate, 1,1-diethyl-2-propynyl ethane sulfonate, 1-ethyl-1-methyl-2-propynyl ethane sulfonate, or 2-butyne-1,4-diyl diethane sulfonate, Among them, preferably 2-propynyl methane sulfonate, 1-methyl-2-propynyl methane sulfonate, 2-butyne-1,4-diyl dimethane sulfonate, and further preferably 2-propynyl methane sulfonate, or 2-butyne-1,4-diyl dimethane sulfonate.

In the nonaqueous electrolytic solution of the present invention, the content of the compound having the carbon-carbon triple bond represented by said general formula (I) contained in the nonaqueous electrolytic solution is preferably 0.001 to 10 mass % in the nonaqueous electrolytic solution. If the content is 10 mass % or less, the fear of the decline of the properties at low temperature due to too much formation of the coating film on the electrode is small. In addition, if the content is 0.001 mass % or more, formation of the coating film is sufficient, and effects of improving the storage properties at high temperature increase. The content is preferably 0.05 mass % or more, and more preferably 0.1 mass % or more, and particularly preferably 0.3 mass % or more, in the nonaqueous electrolytic solution. In addition, the upper limit thereof is preferably 7 mass % or less, more preferably 5 mass % or less, and particularly preferably 3 mass % or less.

Combination of the $LiPF_2(-OC(=O)-C(=O)O-)_2$ and the compound having the carbon-carbon triple bond represented by said general formula (I) with the nonaqueous solvent, the electrolytic salt, and further the following general formula (II) described below allows the nonaqueous electrolytic solution of the present invention to exert synergistically the specific effects of improving the electrochemical properties in a broad temperature range.

(wherein L represents an alkylene group having from 1 to 6 carbon.)

In the present invention, the term "alkylene group" is used as a concept including, as above mentioned, group having one carbon, that is, a methylene group.

[Nonaqueous Solvent]

As the nonaqueous solvent used in the nonaqueous electrolytic solution of the present invention, cyclic carbonate, chain ester, lactone, ether and amide may be mentioned. The nonaqueous solvent preferably contains both of cyclic carbonate and chain ester.

Meanwhile, the term chain ester is used as a concept including chain carbonate and chain carboxylic acid ester.

As the cyclic carbonate, one kind or at least two kinds selected from ethylene carbonate (EC), propylene carbonate (PC), 1,2-butylene carbonate, 2,3-butylene carbonate, 4-fluoro-1,3-dioxolane-2-one (FEC), trans- or cis-4,5-difluoro-1,3-dioxolane-2-one (hereinafter, both of them are collectively referred to as "DFEC"), vinylene carbonate (VC), vinyl ethylene carbonate (VEC), and 4-ethynyl-1,3-dioxolane-2-one (EEC) may be mentioned. One kind or at least two kinds selected from ethylene carbonate, propylene carbonate, 4-fluoro-1,3-dioxolane-2-one, vinylene carbonate and 4-ethynyl-1,3-dioxolane-2-one (EEC) are more suitable.

Among them, at least one kind of cyclic carbonate having an unsaturated bond such as a carbon-carbon double bond and a carbon-carbon triple bond, or a fluorine atom is preferably used since the discharge properties at low temperature after storage at high temperature in the charged state further improves, and those containing both of cyclic carbonate having a unsaturated bond such as a carbon-carbon double bond and a carbon-carbon triple bond and cyclic carbonate having a fluorine atom is more preferably used. As the cyclic carbonate having an unsaturated bond such as a carbon-carbon double bond and a carbon-carbon triple bond, VC, VEC or EEC is further preferable, and as the cyclic carbonate having a fluorine atom, FEC or DFEC is further preferable.

The content of the cyclic carbonate having an unsaturated bond such as a carbon-carbon double bond and a carbon-carbon triple bond is preferably 0.07 volume % or more, more preferably 0.2 volume % or more, and further preferably 0.7 volume % or more, and the upper limit is preferably 7 volume % or less, more preferably 4 volume % or less, and further preferably 2.5 volume % or less with respect to the total volume of the nonaqueous solvent since it can further preferably increase the stability of the coating film at the time of high temperature charge and storage without damage to Li ion permeability at low temperature.

The content of the cyclic carbonate having a fluorine atom is preferably 0.07 volume % or more, more preferably 4 volume % or more and further preferably 7 volume % or more, and the upper limit is preferably 35 volume % or less, more preferably 25 volume % or less, and further preferably 15 volume % or less with respect to the total volume of the nonaqueous solvent since it can further preferably increase the stability of the coating film at the time of high temperature charge and storage without damage to Li ion permeability at low temperature.

In addition, the nonaqueous solvent preferably contains ethylene carbonate and/or propylene carbonate since it reduces the resistance of the coating film formed on the electrode. The content of ethylene carbonate and/or propylene carbonate is preferably 3 volume % or more, more preferably 5 volume % or more, and further preferably 7 volume % or more, and the upper limit is preferably 45 volume % or less, more preferably 35 volume % or less, and further preferably 25 volume % or less with respect to the total volume of the nonaqueous solvent.

These solvents may be used in one kind. In addition, these solvents are preferably used in 2 or more kinds and particularly preferably 3 or more kinds in combination since the electrochemical properties in a broad temperature range are further improved. A suitable combination of these cyclic carbonates is preferably EC and PC, EC and VC, PC and VC, VC and FEC, EC and FEC, PC and FEC, FEC and DFEC, EC and DFEC, PC and DFEC, VC and DFEC, VEC and DFEC, VC and EEC, EC and EEC, EC, PC and VC, EC, PC and FEC, EC, VC and FEC, EC, VC and VEC, EC, VC and EEC, EC, EEC and FEC, PC, VC and FEC, EC, VC and DFEC, PC, VC and DFEC, EC, PC, VC and FEC, EC, PC, VC and DFEC, etc. Among said combinations, the more preferably combinations are a combination of EC and VC, EC and FEC, EC, VC and EEC, EC, EEC and FEC, PC and FEC, EC, PC and VC, EC, PC and FEC, EC, VC and FEC, PC, VC and FEC, EC, PC, VC and FEC, etc.

As the chain ester, asymmetrically-chain carbonates such as methylethyl carbonate (MEC), methylpropyl carbonate (MPC), methylisopropyl carbonate (MIPC), methylbutyl carbonate and ethylpropyl carbonate, symmetrically-chain carbonates such as dimethyl carbonate (DMC), diethyl carbonate (DEC), dipropyl carbonate and dibutyl carbonate, pivalic acid esters such as methyl pivalate, ethyl pivalate and propyl pivalate, and chain carboxylic acid esters such as methyl propionate, ethyl propionate, methyl acetate and ethyl acetate may be suitably mentioned.

The content of the chain ester is not particularly limited, but is preferably used in a range of 60 to 90 volume % with respect to the total volume of the nonaqueous solvent. The above-mentioned range is preferable since the effects of decreasing the viscosity of the nonaqueous electrolytic solution is sufficiently obtained if the content is 60 volume % or more. If the content is 90 volume % or less, the electrical conductivity of the nonaqueous electrolytic solution sufficiently increases, and the electrochemical properties in a broad temperature range improve.

Among said chain esters, a chain ester having a methyl group selected from dimethyl carbonate, methylethyl carbonate, methylpropyl carbonate, methylisopropyl carbonate, methylbutyl carbonate, methyl propionate, methyl acetate and ethyl acetate is preferable, and a chain carbonate having a methyl group is particularly preferable.

In addition, when the chain carbonate is used, it is preferably used in at least two kinds. Furthermore, both of the symmetrically chain carbonate and the asymmetrically chain carbonate are contained more preferably, and it is further preferable that the content of the symmetrically chain carbonate is greater than that of the asymmetrically chain carbonate.

The volume ratio taken up by the symmetrically chain carbonate in the chain carbonate is preferably 51 volume % or more, and is more preferably 55 volume % or more. The upper limit is more preferably 95 volume % or less, and further preferably 85 volume % or less. The symmetrically chain carbonate particularly preferably includes dimethyl carbonate. In addition, the asymmetrically chain carbonate is more preferably those having a methyl group, and particularly preferably methylethyl carbonate.

The above-mentioned case is preferable since the electrochemical properties improve in a further broader temperature range.

The ratio of the cyclic carbonate and the chain ester is, as cyclic carbonate:chain ester (volume ratio), preferably 10:90 to 45:55, more preferably 15:85 to 40:60, and particularly preferably 20:80 to 35:65 from the viewpoint of improvement of the electrochemical properties in a broad temperature range.

For the purpose of markedly improving electrochemical characteristics in a broad temperature range, it is desirable that a compound represented by the following general formula (II) is further added to the nonaqueous electrolytic solution.

(wherein L represents an alkylene group having from 1 to 6 carbon.)

In the above-mentioned general formula (II), L represents an alkylene group having from 1 to 6 carbon.

As specific examples of said L, suitably mentioned are alkylene groups such as a methylene group, an ethane-1,2-diyl group, an ethane-1,1-diyl group, a propane-1,3-diyl group, a propane-1,2-diyl group, a propane-1,1-diyl group, a butane-1,4-diyl group, a butane-1,3-diyl group, a butane-1,2-diyl group, a butane-2,3-diyl group, a pentane-1,5-diyl group, a pentane-1,4-diyl group, a hexane-1,6-diyl group, or a hexane-1,5-diyl group.

Among them, preferably an alkylene group having from 1 to 5 carbon, further preferably an ethane-1,2-diyl group, a propane-1,3-diyl group, a butane-1,4-diyl group, or a pentane-1,5-diyl group.

As the compound represented by said general formula (II), the following compound may be suitably mentioned specifically.

Suitably mentioned are malononitrile, succinonitrile, glutaronitrile, adiponitrile, pimelonitrile, suberonitrile, 2-methylmalononitrile, 2-ethylmalononitrile, 2-methylsuccinonitrile, 2,3-dimethylsuccinonitrile, 2-ethylsuccinonitrile, 2-methylglutaronitrile, 2-methyladiponitrile, or 2-methylpimelonitrile, etc. Among them, preferably succinonitrile, glutaronitrile, adiponitrile, or pimelonitrile.

The content of the compound represented by above-mentioned general formula (II) is preferably 0.001 to 10 mass % in the nonaqueous electrolytic solution. If the content is 10 mass % or less, the fear of the decline of the properties at low temperature due to too much formation of the coating film on the electrode is small. In addition, if the content is 0.001 mass % or more, formation of the coating film is sufficient, and effects of improving the charge and storage properties at high temperature increase. The content is preferably 0.05 mass % or more, and more preferably 0.1 mass % or more, and particularly preferably 0.3 mass % or more in the nonaqueous electrolytic solution. In addition, the upper limit thereof is preferably 7 mass % or less, more preferably 5 mass % or less, and particularly preferably 3 mass % or less.

[Electrolytic Salt]

As the electrolytic salt used in the present invention, the lithium salts described below may be suitably mentioned.

(Lithium Salt)

As the lithium salt, inorganic lithium salts such as $LiPF_6$, $LiBF_4$, and $LiPO_2F_2$, and lithium salts having an oxalate complex as an anion such as $LiB(-OC(=O)-C(=O)O-)_2$, etc. They may be used in one kind or in a mixture of at least two kinds. Among them, $LiPF_6$, or $LiPO_2F_2$ is preferable. The concentration of the lithium salt is ordinarily, preferably 0.5 M or more, more preferably 0.9 M or more, and further preferably 1.2 M or more with respect to said nonaqueous solvent. In addition, the upper limit thereof is preferably 2.5 M or less, more preferably 2.1 M or less, and further preferably 1.8 M or less.

In addition, one contained $LiPF_6$ is preferable, and one further contained $LiPO_2F_2$ is further preferable. The ratio of $LiPO_2F_2$ taken up in the nonaqueous solvent is preferably 0.001M or more since effects of improving the electrochemical properties in a broad temperature range are easily exerted, and the ratio is preferably 0.5 M or less since the fear of the decline of the effects of improving the electrochemical properties in a broad temperature range is small. The ratio is preferably 0.02 M or more, particularly preferably 0.03 M or more, and most preferably 0.04 M or more. The upper limit thereof is preferably 0.4 M or less, and particularly preferably 0.2 M or less, and most preferably 0.1 M or less.

[Preparation of the Nonaqueous Electrolytic Solution]

The nonaqueous electrolytic solution of the present invention may be obtained by, for example, mixing the above nonaqueous solvents, and adding, to this, $LiPF_2(-OC(=O)-C(=O)O-)_2$ and the compound represented by the general formula (I) having a carbon-carbon triple bond, with respect to the electrolyte salts and the nonaqueous electrolytic solution.

At this time, as the compound added to the nonaqueous solvent and the nonaqueous electrolytic solution that is used, the compound having small impurities as possible by being purified in advance is preferably used within a range where the productivity does not prominently decline.

The nonaqueous electrolytic solution of the present invention may be used in the first and the second energy storage devices described below. As the nonaqueous electrolyte, not only liquid one, but also gellated one may be used. Furthermore, the nonaqueous electrolytic solution of the present invention may be also used for a solid polymer electrolyte. Among these, the nonaqueous electrolytic solution of the present invention is preferably used for the first energy storage device (namely, for a lithium battery) or for the second energy storage device (namely, for a lithium ion capacitor) in which a lithium salt is used as the electrolyte salts, and more preferably used for a lithium battery, and most suitably used for the lithium secondary battery.

[First Energy Storage Device (Lithium Battery)]

The lithium battery of the present invention is a general term for a lithium primary battery and a lithium secondary battery. Further, in the present description, the term of the lithium secondary battery is used as a concept also including the so-called lithium ion secondary battery. The lithium battery of the present invention comprises a positive electrode, a negative electrode and the nonaqueous electrolytic solution in which an electrolyte salt is dissolved in a nonaqueous solvent. The constituent members such as the positive electrode and the negative electrode etc. besides the nonaqueous electrolytic solution may be used without particular limitation.

For example, as the positive electrode active material for a lithium secondary battery, a complex metal oxide with lithium, which contains one or more kinds selected from cobalt, manganese and nickel, is used. These positive electrode active materials may be used alone in one kind or in combination of two or more kinds.

As the lithium complex metal oxide, for example, $LiCoO_2$, $LiMn_2O_4$, $LiNiO_2$, $LiCo_{1-x}Ni_xO_2$ ($0.01<x<1$), $LiCo_{1/3}Ni_{1/3}Mn_{1/3}O_2$, $LiNi_{1/2}Mn_{3/2}O_4$, $LiCo_{0.98}Mg_{0.02}O_2$, etc. may be mentioned. Further, it may be used in combination such as $LiCoO_2$ and $LiMn_2O_4$, $LiCoO_2$ and $LiNiO_2$, $LiMn_2O_4$ and $LiNiO_2$.

In addition, a portion of the lithium complex metal oxide may be substituted with another element in order to improve the safety at the time of the overcharge, or the cycle property, and allow the usage at 4.3 V or more of the charge potential based on Li. For example, a portion of cobalt, manganese or nickel may be substituted with at least one or more kinds of elements such as Sn, Mg, Fe, Ti, Al, Zr, Cr, V, Ga, Zn, Cu, Bi, Mo and La, or a portion of O may be substituted with S or F, or the lithium complex metal oxide may be coated with a compound that contains these other elements.

Among these, a lithium complex metal oxide that allows the usage at 4.3 V or more of the charge potential of the positive electrode based on Li in the full-charge state, such as $LiCoO_2$, $LiMn_2O_4$ and $LiNiO_2$, is preferable, a lithium complex metal oxide that allows the usage at 4.4 V or more based on Li such as a solid solution with $LiCo_{1-x}M_xO_2$ (wherein, M is at least one or more kinds of elements selected from Sn, Mg, Fe, Ti, Al, Zr, Cr, V, Ga, Zn and Cu, $0.001 \leq x \leq 0.05$), $LiCo_{1/3}Ni_{1/3}Mn_{1/3}O_2$, $LiNi_{1/2}Mn_{3/2}O_4$, and $Li_2MnO_3$ and $LiMO_2$ (M is a transitional metal such as Co, Ni, Mn and Fe) is more preferable. When a lithium complex metal oxide operating at high charge voltage is used, particularly the electrochemical properties in a broad temperature range easily decline due to the reaction with an electrolytic solution at the time of the charge. However, the lithium secondary battery related to the present invention can suppress the decline of these electrochemical properties.

Furthermore, as the positive electrode active material, lithium-containing olivine-type phosphoric acid salt may be also used. Particularly, lithium-containing olivine-type phosphoric acid salt containing at least one or more kinds selected from iron, cobalt, nickel and manganese is preferable. As specific examples thereof, $LiFePO_4$, $LiCoPO_4$, $LiNiPO_4$, $LiMnPO_4$, etc. may be mentioned.

A portion of these lithium-containing olivine-type phosphoric acid salts may be substituted with another element. A portion of iron, cobalt, nickel or manganese may be substituted with one or more kinds of an element selected from Co, Mn, Ni, Mg, Al, B, Ti, V, Nb, Cu, Zn, Mo, Ca, Sr, W and Zr, etc. or the lithium-containing olivine-type phosphoric acid salt may be coated with a compound containing these other elements or a carbon material. Among these, $LiFePO_4$ or $LiMnPO_4$ is preferable.

Further, the lithium-containing olivine-type phosphoric acid salt may be used in a mixture with, for example, the above positive electrode active material.

In addition, As the positive electrode for a lithium primary battery, one kind, or two or more kinds of metal elements or chalcogen compounds such as CuO, $Cu_2O$, $Ag_2O$, $Ag_2CrO_4$, CuS, $CuSO_4$, $TiO_2$, $TiS_2$, $SiO_2$, SnO, $V_2O_5$, $V_6O_{12}$, $VO_x$, $Nb_2O_5$, $Bi_2O_3$, $Bi_2Pb_2O_5$, $Sb_2O_3$, $CrO_3$, $Cr_2O_3$, $MoO_3$, $WO_3$, $SeO_2$, $MnO_2$, $Mn_2O_3$, $Fe_2O_3$, FeO, $Fe_3O_4$, $Ni_2O_3$, NiO, $CoO_3$ and CoO, sulfur compounds such as $SO_2$ and $SOCl_2$, fluorocarbon (fluorographite) represented by general formula $(CF_x)_n$, etc. may be mentioned. Among these, $MnO_2$, $V_2O_5$, fluorographite etc. are preferable.

The conductive material of the positive electrode is not particularly limited as long as an electron conduction material that does not cause chemical change. For example, graphites such as natural graphite (flattened graphite etc.) and artificial graphite, carbon black such as acetylene black, Ketjen black, channel black, furnace black, lamp black and thermal black, etc. may be mentioned. In addition, the graphite and the carbon black may be suitably mixed and used. The addition amount of the conductive material to the positive electrode mixture is preferably 1 to 10 mass %, and particularly preferably 2 to 5 mass %.

The positive electrode can be manufactured by mixing the Above-mentioned positive electrode active material with the conductive material such as acetylene black and carbon black, and a binder such as polytetrafluoroethylene (PTFE), polyvinylidene fluoride (PVDF), a copolymer of styrene and butadiene (SBR), a copolymer of acrylonitrile and butadiene (NBR), carboxymethyl cellulose (CMC), and ethylene-propylene-diene terpolymer, and adding a high boiling-point solvent such as 1-methyl-2-pyrrolidone to this, and kneading them to prepare the positive electrode mixture, and then applying this positive electrode mixture to a current collector such as aluminum foil and lath plate made of stainless-steel, drying, pressure molding, and then subjecting the resultant to heat treatment at a temperature of 50° C. to 250° C. or so for 2 hours or so under vacuum.

The density of parts excluding the current collector of the positive electrode is ordinarily 1.5 g/cm$^3$ or more, preferably 2 g/cm$^3$ or more, more preferably 3 g/cm$^3$ or more, and further preferably 3.6 g/cm$^3$ or more in order to further enhance the capacity of the battery. Meanwhile, the upper limit is preferably 4 g/cm$^3$ or less.

As the negative electrode active material for a lithium secondary battery, lithium metal or lithium alloy, and a carbon material which can absorb and release lithium [graphitizable carbon, non-graphitizable carbon having 0.37 nm or more of the spacing of the (002) plane, graphite having 0.34 nm or less of the spacing of the (002) plane, etc.], tin (simple substance), a tin compound, silicon (simple substance), a silicon compound, and a lithium titanate compound such as $Li_4Ti_5O_{12}$ etc. may be used alone in one kind or in combination of two or more kinds.

Among these, a high crystalline carbon material such as artificial graphite and natural graphite is preferable, and a carbon material having a graphite-type crystalline structure having 0.340 nm (nanometer) or less, particularly 0.335 to 0.337 nm of the spacing ($d_{002}$) of the lattice plane (002) is particularly preferable from the view of absorption and release ability of the lithium ion.

A ratio (I (110)/I (004)) of a peak intensity I (110) of a (110) plane and a peak intensity I (004) of a (004) plane in the graphite crystal which are obtained from X ray diffractiometry of the negative electrode sheet subjected to pressure molding so that a density of parts excluding the current collector of the negative electrode is 1.5 g/cm$^3$ or more is controlled to 0.01 or more by using artificial graphite particles having a bulky structure in which plural flattened graphite fine particles are put together or combined non-parallel to each other, or graphite particles obtained by exerting repeatedly a mechanical action, such as a compressive force, a friction force, a shearing force, etc. on flaky natural graphite particles to subject them to spheroidizing treatment, whereby the electrochemical characteristics in a further broader temperature range are improved, and therefore it is preferred. The ratio is more preferably 0.05 or more, further preferably 0.1 or more. Further, the negative electrode sheet is treated too much in a certain case and reduced in a crystallinity to reduce a discharge capacity of the battery, and therefore an upper limit thereof is preferably 0.5 or less, more preferably 0.3 or less.

Further, the high crystalline carbon material (core material) is preferably coated with a carbon material having lower crystallinity than that of the core material since the electrochemical properties in a broad temperature range becomes further better. The crystallinity of the coated carbon material can be confirmed by TEM.

When a high crystalline carbon material is used, the high crystalline carbon material reacts with a nonaqueous electrolytic solution at the time of the charge, and the electrochemical properties at high temperature or low temperature tends to decline due to increase of the interface resistance. However, with the lithium secondary battery related to the present invention, the electrochemical properties in a broad temperature range becomes better.

Further, as the metal compound which can absorb and release lithium as the negative electrode active material, compounds containing at least one kind of a metal element such as Si, Ge, Sn, Pb, P, Sb, Bi, Al, Ga, In, Ti, Mn, Fe, Co, Ni, Cu, Zn, Ag, Mg, Sr and Ba may be mentioned. These metal compounds may be used in any form such as an element, an alloy, an oxide, a nitride, a sulfide, a boride, an alloy with lithium. However, the metal compound is preferably any one of an element, an alloy, an oxide and an alloy with lithium since it allows the battery to have high capacity. Among these, those containing at least one kind of an element selected from Si, Ge and Sn are preferable, those containing at least one kind of an element selected from Si and Sn are more preferable since it allows the battery to have high capacity.

The negative electrode can be manufactured in a similar manner to the manufacture of the above-mentioned positive electrode by using and kneading the conductive material, the binder and the high boiling point solvent to prepare a negative electrode mixture, and then applying this negative electrode mixture to a current collector such as copper foil, drying, pressure molding, and then subjecting the resultant to heat treatment at a temperature of 50° C. to 250° C. or so for 2 hours or so under vacuum.

The density of parts excluding the current collector of the negative electrode is ordinarily 1.1 g/cm$^3$ or more, preferably 1.5 g/cm$^3$ or more, and particularly preferably 1.7 g/cm$^3$ or more in order to further enhance the battery capacity. Meanwhile, the upper limit is preferably 2 g/cm$^3$ or less.

Further, as the negative electrode active material for the lithium primary battery, lithium metal or lithium alloy may be mentioned.

The structure of the lithium battery is not particularly limited, and a coin-type battery, a cylinder-type battery, an square-shaped battery, a laminate-type battery etc. having a unilamellar or laminated separator may be applied.

The separator for the battery is not particularly limited, but a unilamellar or laminated microporous film of a polyolefin such as polypropylene and polyethylene, woven fabric cloth, nonwoven fabric cloth, etc. may be used.

The lithium secondary battery of the present invention is excellent in the electrochemical properties in a broad temperature range even when the charge termination voltage is 4.2 V or more, particularly 4.3 V or more, and further the properties are good even when the charge termination voltage is 4.4 V or more. The discharge cut-off voltage is ordinarily 2.8 V or more, and further can be rendered to be 2.5 V or more. However, the discharge cut-off voltage can be rendered to be 2.0 V or more with the lithium secondary battery of the present invention. The current value is not particularly limited, but is ordinarily used in a range of 0.1 to 30 C. Further, the lithium battery of the present invention can be charged and discharged at −40 to 100° C., preferably −10 to 80° C.

In the present invention, as a countermeasure for increase of the inner pressure of the lithium battery, a method of establishing a safety valve at the cover of the battery, or a method of making incision on a member such as the battery can or the gasket may be also adopted. Further, as a countermeasure for the safety to prevent the overcharge, current shutoff mechanism that shutoffs the current upon perception of the inner pressure of the battery may be established on the cover of the battery.

[Second Energy Storage Device (Lithium Ion Capacitor)]

The second energy storage device of the present invention is an energy storage device that stores the energy using intercalation of lithium ion into a carbon material such as graphite that is the negative electrode. The energy storage device is called the lithium ion capacitor (LIC). As the positive electrode, for example, those using an electric double layer between the activated carbon electrode and the electrolytic solution, those using the doping/de-doping reaction of n conjugated polymer electrode, etc. may be mentioned In the electrolytic solution, at least lithium salt such as $LiPF_6$ is contained.

EXAMPLES

Hereinafter, Examples of the electrolytic solution of the present invention will be described. However, the present invention is not limited to these Examples.

Examples 1 to 11 and Comparative Examples 1 and 2

[Manufacture of Lithium Ion Secondary Cell]

94 Mass % of $LiNi_{1/3}Mn_{1/3}Co_{1/3}O_2$ and 3 mass % of acetylene black (conductive material) were mixed, and added to a solution in which 3 mass % of polyvinylidene fluoride (binder) was dissolved in 1-methyl-2-pyrrolidone in advance, and mixed, to prepare a paste of the positive electrode mixture. This paste of the positive electrode mixture was applied onto both surfaces of an aluminum foil (current collector), dried, processed under pressure and cut into a predetermined size, thereby producing a belt-like positive electrode sheet. The density of the portion excluding the current collector of the positive electrode was 3.6 g/cm$^3$. In addition, 95 mass % of artificial graphite (negative electrode active material, $d_{002}$=0.335 nm) was added to a solution in which 5 mass % of polyvinylidene fluoride (binder) was dissolved in 1-methyl-2-pyrrolidone in advance, and mixed, to prepare a paste of the negative electrode mixture. This paste of the negative electrode mixture was applied onto both surfaces of a copper foil (current collector), dried, processed under pressure and cut into a predetermined size, thereby producing a belt-like negative electrode sheet. The density of the portion excluding the current collector of the negative electrode was 1.5 g/cm$^3$. Then, the positive electrode sheet, a separator made of a microporous polyethylene film, and the negative electrode sheet were laminated in this order, and obtained laminated body was wound into a spiral shape. Then obtained wound body was inserted into a cylindrical battery can made by nickel-plated iron which worked as negative electrode terminal. Further, the nonaqueous electrolytic solution prepared by adding the compound described in Table 1 in a predetermined amount were injected, and battery lid having positive electrode terminal was used to caulk the can through a gasket, thereby 18650 type cylindrical battery was obtained. Note that positive electrode terminal was connected to positive electrode sheet and aluminum lead tab in battery in advance, and negative electrode can was connected to negative electrode sheet and nickel lead tab in battery in advance.

[Evaluation of Low-Temperature Characteristics after High-Temperature Charging Storage]

(Initial Discharge Capacity)

In a thermostatic chamber kept at 25° C., the cylindrical battery fabricated according to the above-mentioned method was charged up to a final voltage of 4.2 V for 3 hours with a constant current of 1 C and under a constant voltage, then the temperature of the thermostatic chamber was lowered to 0° C., and the battery was discharged under a constant current of 1 C to a final voltage of 2.75 V. The initial discharge capacity at 0° C. was measured.

(High-Temperature Charging Storage Test)

Next, in a thermostatic chamber at 25° C., the cylindrical battery was charged up to a final voltage of 4.2 V for 7 hours with a constant current of 0.2 C and under a constant voltage, and then, while kept in a thermostatic chamber at 60° C., this was stored for 7 days. Afterwards, the battery was put into a thermostatic chamber at 25° C., and then once discharged to a final voltage of 2.75 V under a constant current of 1 C.

(Discharge Capacity after High-Temperature Charging Storage)

Further afterwards, the discharge capacity at 0° C. after high-temperature charging storage of the battery was measured, in the same manner as that for the measurement of the initial discharge capacity thereof.

(Low-Temperature Load Characteristics after High-Temperature Charging Storage Test)

The low-temperature characteristics after high-temperature charging storage were determined based on the 0° C. discharge capacity retention rate mentioned below.

0° C. Discharge Capacity Retention rate after high-temperature charging storage (%)=[(discharge capacity at 0° C. after high-temperature charging storage/initial discharge capacity at 0° C.)×100.

And the condition in producing the batteries and the battery characteristics are shown in Table 1.

TABLE 1

| | Composition of electrolytic salt Composition of nonaqueous electrolytic solution (Volume ratio of solvent) | $LiPF_2(C_2O_4)_2$ Addition amount (Content in nonaqueous electrolytic solution (mass %)) | Compound of general formula (I) | Addition amount (Content in nonaqueous electrolytic solution (mass %)) | 0° C. discharge capacity retenion after charge and storage at high temperature (%) |
|---|---|---|---|---|---|
| Example 1 | 1.2M LiPF6 EC/DMC/MEC (30/40/30) | 1 | (sulfonate structure with S(=O)(=O)–O–) | 0.05 | 77 |
| Example 2 | 1.2M LiPF6 EC/DMC/MEC (30/40/30) | 1 | | 1 | 83 |

TABLE 1-continued

| | Composition of electrolytic salt Composition of nonaqueous electrolytic solution (Volume ratio of solvent) | LiPF$_2$(C$_2$O$_4$)$_2$ Addition amount (Content in nonaqueous electrolytic solution (mass %)) | Compound of general formula (I) | Addition amount (Content in nonaqueous electrolytic solution (mass %)) | 0° C. discharge capacity retenion after charge and storage at high temperature (%) |
|---|---|---|---|---|---|
| Example 3 | 1.2M LiPF6 EC/DMC/MEC (30/40/30) | 1 | | 3 | 81 |
| Example 4 | 1.2M LiPF6 EC/DMC/MEC (30/40/30) | 0.05 | | 1 | 78 |
| Example 5 | 1.2M LiPF6 EC/DMC/MEC (30/40/30) | 3 | | 1 | 80 |
| Example 6 | 1.2M LiPF6 EC/DMC/MEC (30/40/30) | 1 |  | 0.05 | 80 |
| Example 7 | 1.2M LiPF6 EC/DMC/MEC (30/40/30) | 1 | | 1 | 84 |
| Example 8 | 1.2M LiPF6 EC/DMC/MEC (30/40/30) | 1 | | 3 | 82 |
| Example 9 | 1.2M LiPF6 EC/DMC/MEC (30/40/30) | 0.05 | | 1 | 80 |
| Example 10 | 1.2M LiPF6 EC/DMC/MEC (30/40/30) | 3 | | 1 | 81 |
| Example 11 | 1.2M LiPF6 + 0.05M LiPO2F2 EC/VC/FEC/DMC/MEC (28/1/1/40/30) + Adiponitrile (1 mass %) | 1 | | 1 | 86 |
| Comparative Example 1 | 1.2M LiPF6 EC/DMC/MEC (30/40/30) | — | None | — | 59 |
| Comparative Example 2 | 1.2M LiPF6 EC/DMC/MEC (30/40/30) | 1 | None | — | 65 |

Example 12 and Comparative Example 3

Silicon (simple substance) (negative electrode active material) was used instead of the negative electrode active materials used in Example 2 and Comparative Example 2, to manufacture the negative electrode sheet. 80 mass % of silicon (simple substance) and 15 mass % of acetylene black (conductive material) were mixed, and added to a solution in which 5 mass % of polyvinylidene fluoride (binder) was dissolved in 1-methyl-2-pyrrolidone in advance, and mixed, to prepare a paste of the negative electrode mixture. This paste of the negative electrode mixture was applied onto a copper foil (current collector), dried, pressure treated, and punched to a desired size, to manufacture a negative electrode sheet. Other steps were performed similarly to Example 2 and Comparative Example 2 to manufacture a cylindrical battery, and evaluations for the battery were performed. The results are listed in Table 2.

TABLE 2

| | Composition of electrolytic salt Composition of nonaqueous electrolytic solution (Volume ratio of solvent) | LiPF$_2$(C$_2$O$_4$)$_2$ Addition amount (Content in nonaqueous electrolytic solution (mass %)) | Compound of general formula (I) | Addition amount (Content in nonaqueous electrolytic solution (mass %)) | 0° C. discharge capacity retention after charge and storage at high temperature (%) |
|---|---|---|---|---|---|
| Example 12 | 1.2M LiPF6 EC/DMC/MEC (30/40/30) | 1 | 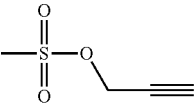 | 1 | 77 |
| Comparative Example 3 | 1.2M LiPF6 EC/DMC/MEC (30/40/30) | 1 | None | — | 68 |

Example 13 and Comparative Example 4

LiFePO$_4$ (positive electrode active material) coated with amorphous carbon was used instead of the positive electrode active materials used in Example 2 and Comparative Example 2, to manufacture a positive electrode sheet. 90 mass % of LiFePO$_4$ coated with amorphous carbon and 5 mass % of acetylene black (conductive material) were mixed, and added to a solution in which 5 mass % of polyvinylidene fluoride (binder) was dissolved in 1-methyl-2-pyrrolidone in advance, and mixed, to prepare a paste of the positive electrode mixture. This paste of the positive electrode mixture was applied onto one face of an aluminum foil (current collector), dried, pressure treated, and punched to a desired size, to manufacture a positive electrode sheet. The charge termination voltage was 3.6 V and the discharge cut-off voltage was 2.0 V in the battery evaluations. Other steps were performed similarly to Example 2 and Comparative Example 2 to manufacture a cylindrical battery, and evaluations for the battery were performed. The results are listed in Table 3.

TABLE 3

| Composition of electrolytic salt / Composition of nonaqueous electrolytic solution (Volume ratio of solvent) | LiPF$_2$(C$_2$O$_4$)$_2$ Addition amount (Content in nonaqueous electrolytic solution (mass %)) | Compound of general formula (I) | Addition amount (Content in nonaqueous electrolytic solution (mass %)) | 0° C. discharge capacity retenion after charge and storage at high temperature (%) |
|---|---|---|---|---|
| Example 13: 1.2M LiPF6 EC/DMC/MEC (30/40/30) | 1 | 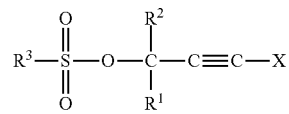 | 1 | 89 |
| Comparative Example 4: 1.2M LiPF6 EC/DMC/MEC (30/40/30) | 1 | None | — | 72 |

Any of the lithium secondary cells of Examples 1 to 11 described above prominently improves the electrochemical properties in a broad temperature range in comparison to the lithium secondary cell of Comparative Example 1 that does not contain LiPF$_2$(—OC(=O)—C(=O)O—)$_2$ and the compound represented by said general formula (I) in the nonaqueous electrolytic solution of the present invention, or the lithium secondary cell of Comparative Example 2 that contains LiPF$_2$(—OC(=O)—C(=O)O—)$_2$ and does not contain the compound represented by said general formula (I). From those described above, it was revealed that the effects of the present invention were unique effects when the nonaqueous electrolytic solution in which an electrolytic salt was dissolved in a nonaqueous solvent contained the specific compound of the present invention.

In addition, similar effects are exerted when using silicon (simple substance) for the negative electrode from the comparison of Example 12 with Comparative Example 3, and when using the lithium-containing olivine-type phosphoric acid iron salt (LiFePO$_4$) for the positive electrode from the comparison of Example 13 with Comparative Example 4. Accordingly, it is confirmed that the effects of the present invention are not effects depending on a specific positive electrode or negative electrode.

Furthermore, the nonaqueous electrolytic solution of the present invention also has effects of improving the discharge property in a broad temperature range of a lithium primary cell.

INDUSTRIAL APPLICABILITY

The energy storage device using the nonaqueous electrolytic solution of the present invention is useful as energy storage devices superior in electrochemical properties in a broad temperature range.

The invention claimed is:

1. A nonaqueous electrolytic solution comprising:
   (i) an electrolyte salt;
   (ii) a nonaqueous solvent, comprising ethylene carbonate, propylene carbonate, or both, in a total amount of 3 to 45 volume % based on the volume of the nonaqueous solvent;
   (iii) LiPF$_2$(—OC(=O)—C(=O)O—)$_2$; and
   (iv) at least one compound represented by formula (I):

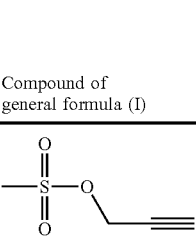

wherein R$^1$ and R$^2$ each independently represent a hydrogen atom or an alkyl group having from 1 to 6 carbon atoms and optionally substituted with a halogen atom; and R$^3$ represents a methyl group or an ethyl group, X represents a hydrogen atom or —CR$^1$R$^2$—OS(=O)$_2$—R$^3$, and wherein a content of LiPF$_2$(—OC(=O)—C(=O)O—)$_2$ is 0.001 to 4 mass % in the nonaqueous electrolytic solution, and a content of the compound represented by the formula (I) is 0.001 to 5 mass % in the nonaqueous electrolytic solution.

2. The nonaqueous electrolytic solution as set forth in claim 1, wherein R$^3$ in said compound represented by the general formula (I) is a methyl group.

3. The nonaqueous electrolytic solution as set forth in claim 1, wherein R$^1$ and R$^2$ in said compound represented by the general formula (I) are a hydrogen atom.

4. The nonaqueous electrolytic solution as set forth in claim 1, wherein said compound represented by the general formula (I) is 2-propynyl methane sulfonate or 2-butyne-1,4-diyldimethane sulfonate.

5. The nonaqueous electrolytic solution as set forth in claim 1, wherein the electrolyte salt comprises LiPO$_2$F$_2$.

6. The nonaqueous electrolytic solution as set forth in claim 5, wherein the content of LiPO$_2$F$_2$ in the nonaqueous electrolytic solution is 0.001 to 0.4M.

7. The nonaqueous electrolytic solution as set forth in claim 1, further comprising at least one compound represented by the formula (II):

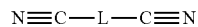 (II)

wherein L represents an alkylene group having from 1 to 6 carbon atoms.

8. The nonaqueous electrolytic solution as set forth in claim 7, wherein a content of said compound represented by the formula (II) is 0.001 to 10 mass % in the nonaqueous electrolytic solution.

9. The nonaqueous electrolytic solution as set forth in claim 7, wherein said compound represented by the general formula (II) is adiponitrile.

10. The nonaqueous electrolytic solution as set forth in claim 1, wherein said nonaqueous solvent further comprises a chain ester.

11. The nonaqueous electrolytic solution as set forth in claim 10, wherein said chain ester is at least one selected from the group consisting of methylethyl carbonate, methylpropyl carbonate, methylisopropyl carbonate, methylbutyl carbonate, ethylpropyl carbonate, dimethyl carbonate, diethyl carbonate, dipropyl carbonate, dibutyl carbonate, a pivalic acid ester, methyl propionate, ethyl propionate, methyl acetate and ethyl acetate.

12. The nonaqueous electrolytic solution as set forth in claim 1, wherein said nonaqueous solvent further comprises at least one additional cyclic carbonate selected from the group consisting of vinylene carbonate, vinyl ethylene carbonate, 4-ethynyl-1,3-dioxolane-2-one, 4-fluoro-1,3-dioxolane-2-one, trans- or cis-4,5-difluoro-1,3-dioxolane-2-one, 1,2-butylene carbonate and 2,3-butylene carbonate.

13. The nonaqueous electrolytic solution as set forth in claim 12, wherein said additional cyclic carbonate comprises:

(a) at least one cyclic carbonate selected from the group consisting of vinylene carbonate, vinyl ethylene carbonate, and 4-ethynyl-1,3-dioxolane-2-one, and (b) at least one cyclic carbonate selected from the group consisting of 4-fluoro-1,3-dioxolane-2-one, and trans- or cis-4,5-difluoro-1,3-dioxolane-2-one.

14. The nonaqueous electrolytic solution as set forth in claim 1, wherein said electrolyte salt is a lithium salt.

15. The nonaqueous electrolytic solution as set forth in claim 1, wherein said electrolyte salt is at least one selected from the group consisting of $LiPF_6$, $LiBF_4$, $LiPO_2F_2$, and $LiB(-OC(=O)-C(=O)O-)_2$.

16. The nonaqueous electrolytic solution as set forth in claim 1, wherein the concentration of the electrolyte salt is 0.5 to 2.5 M with respect to said nonaqueous solvent.

17. An energy storage device comprising a positive electrode, a negative electrode and the nonaqueous electrolytic solution of claim 1.

18. The energy storage device as set forth in claim 17, wherein said positive electrode comprises at least one selected from the group consisting of lithium complex metal oxides and lithium-containing olivine-type phosphoric acid salts as a positive electrode active material.

19. The energy storage device as set forth in claim 17, wherein said negative electrode comprises at least one selected from the group consisting of lithium metal, lithium alloy, carbon materials which can absorb and release lithium, and metal compounds which can absorb and release lithium as a negative electrode active material.

* * * * *